(12) United States Patent
Nilsson et al.

(10) Patent No.: US 12,474,193 B2
(45) Date of Patent: Nov. 18, 2025

(54) ALARM HANDLING IN LOOP-POWERED FIELD DEVICE

(71) Applicant: Rosemount Tank Radar AB, Mölnlycke (SE)

(72) Inventors: Leif Nilsson, Linköping (SE); Tobias Lilja, Sturefors (SE); Hans Arkesten, Borensberg (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 348 days.

(21) Appl. No.: 18/168,648

(22) Filed: Feb. 14, 2023

(65) Prior Publication Data

US 2023/0280201 A1    Sep. 7, 2023

(30) Foreign Application Priority Data

Mar. 7, 2022 (EP) .................................... 22160525

(51) Int. Cl.
G01F 23/284 (2006.01)
G01D 21/02 (2006.01)

(52) U.S. Cl.
CPC ........... G01F 23/284 (2013.01); G01D 21/02 (2013.01)

(58) Field of Classification Search
CPC ............................. G01D 21/02; G01F 23/284
See application file for complete search history.

(56) References Cited

U.S. PATENT DOCUMENTS

| 7,835,125 B2 | 11/2010 | Freiburger et al. |
| 2005/0030185 A1 | 2/2005 | Huisenga et al. |
| 2006/0069455 A1 | 3/2006 | Longsdorf et al. |
| 2008/0007307 A1 | 1/2008 | Freiburger et al. |
| 2011/0010120 A1 | 1/2011 | Wehrs et al. |
| 2011/0282467 A1 | 11/2011 | Schulte |
| 2021/0164827 A1 | 6/2021 | Frühauf et al. |

FOREIGN PATENT DOCUMENTS

| DE | 112004000339 T5 | 3/2006 | |
| EP | 1860513 B1 | 6/2010 | |
| WO | WO-9508123 A1 * | 3/1995 | ............. G01R 27/14 |
| WO | WO-2004076986 A1 * | 9/2004 | ............. G01F 23/28 |

OTHER PUBLICATIONS

Extended European Search Report from European Patent Application No. 22160525.6, dated Aug. 4, 2022.

* cited by examiner

Primary Examiner — Jack W Keith
Assistant Examiner — Clayton Paul Ridder
(74) Attorney, Agent, or Firm — Westman, Champlin & Koehler, P.A.

(57) ABSTRACT

A field device comprising measurement circuitry; loop current circuitry; voltage measurement circuitry; and a controller configured to: acquire a first value of a process variable; determine if the voltage received by the field device is sufficient to support a first loop current; control, when the voltage is insufficient to support the first loop current, the loop current to an alarm current lower than a predefined alarm threshold current; acquire a second value of the process variable and a present voltage received by the field device; determine a second loop current; determine, based on the present voltage and an estimation of a loop impedance, whether or not the present voltage is sufficient for supporting the second loop current; and control, when it is determined that the present voltage received by the field device from the current loop is sufficient, the loop current from the alarm current to the second loop current.

12 Claims, 4 Drawing Sheets

ALARM HANDLING IN LOOP-POWERED FIELD DEVICE

CROSS-REFERENCE TO RELATED APPLICATION

This application claims priority to European Patent Application No. 22160525.6, filed Mar. 7, 2022, the content of which is hereby incorporated by reference in its entirety.

FIELD OF THE INVENTION

The present invention relates to a field device and to a method of operating a field device.

BACKGROUND OF THE INVENTION

Field devices are often used in the industry to measure various process variables, such as pressure, temperature, flow or product level. In particular, a radar level gauge system may be used for measuring the level of a product such as a process fluid, a granular compound or another material.

In a radar level gauge system, an electromagnetic transmit signal may be propagated from a transceiver arranged at the top of a tank towards a surface of a product in the tank, and an electromagnetic reflection signal, resulting from reflection of the transmit signal at the surface, returns to the transceiver. Based on the transmit signal and the reflection signal, the distance to the surface of the product can be determined, from which the level of the product in the tank can be deduced.

In many facilities, such as process industrial facilities, where field devices are used, there is existing wiring between the field device and a remote location, such as a host. The existing wiring often forms a two-wire current loop for communication of commands from the host to the field device and a measurement signal indicative of a process variable from the field device to the host. Communication on the two-wire current loop may take place by controlling the current flowing through the loop. In a 4-20 mA loop, the measurement signal may, for example, be the loop current itself. As an alternative or complement to such an analog current level, digital information may be communicated by modulating the loop current, for example using the HART-protocol.

In addition to being able to receive and send signals over the two-wire current loop, the field device may need to be able to operate using electric power drawn from the two-wire current loop. In other words, the field device may be a loop-powered field device.

The loop voltage may vary over time, and may at some point become too low to sustain reliable operation of the field device. Before or after such a point in time, the loop voltage may be sufficient for operation of the field device, but not for supporting a loop current indicating a present value of a process variable measured by the field device.

In the event that a reliable loop current cannot be supported by the current loop, the field device should be configured to control the loop current to an alarm current lower than a predefined alarm threshold. When the situation improves, the field device should resume normal operation. However, the resumption of normal operation should not result in an immediate return to the alarm current, and the loop current output following resumption of operation should be reliable.

SUMMARY

It is an object of the present invention to address the above, and to provide an improved field device, in particular providing for improved performance when resuming normal operation following a low voltage alarm state.

According to a first aspect of the present invention, it is therefore provided a field device comprising: measurement circuitry for determining a value of a process variable using energy received via a two-wire current loop; loop current circuitry for controlling a loop current flowing through the current loop; voltage measurement circuitry for providing a signal indicative of a voltage received by the field device from the current loop; and a controller coupled to the measurement circuitry, the loop current circuitry, and the voltage measurement circuitry, the controller being configured to: acquire a first value of the process variable from the measurement circuitry; determine if the voltage received by the field device from the current loop is sufficient to support a first loop current representing the first value of the process variable; control, when it is determined that the voltage received by the field device from the current loop is insufficient to support the first loop current, the loop current circuitry to control the loop current to an alarm current lower than a predefined alarm threshold current; acquire a second value of the process variable from the measurement circuitry and a signal from the voltage measurement circuitry indicating a present voltage received by the field device from the current loop; determine a second loop current representing the second value of the process variable; determine, based on the signal indicating the present voltage received by the field device from the current loop and an estimation of a loop impedance of the current loop as seen by the field device, whether or not the present voltage received by the field device from the current loop is sufficient for supporting the second loop current; and control, when it is determined that the present voltage received by the field device from the current loop is sufficient for supporting the second loop current, the loop current circuitry to change the loop current from the alarm current to the second loop current.

By a "field device" should be understood any device that determines a process variable and communicates a measurement signal indicative of that process variable to a remote location. Examples of field devices include devices for determining process variables such as filling level, temperature, pressure, fluid flow etc.

As was also mentioned in the Background section, the measurement signal may, for example, be a constant current and/or a time-varying current superimposed on a constant current. Such a time-varying current may modulate digital information, for example according to the HART communication protocol.

The present invention is based on the realization that the reduction in the loop current resulting from the output of the alarm current typically results in an increase in the voltage received by the field device from the current loop, and that this phenomenon is the result of a reduced voltage drop over the loop impedance as seen by the current loop, due to the reduced current through the current loop. If the loop current were increased, the voltage received by the field device would again decrease. Based on this, the present inventors have deduced that a decision to resume normal operation should not only be based on the present voltage received by the field device, but additionally on an estimation of the loop impedance of the current loop as seen by the field device.

Hereby, the voltage drop over the loop impedance can be estimated, and it can then be more reliably determined whether or not the available loop voltage will be sufficient for correctly and sustainably providing a loop current indicating a measured value of the process variable.

The loop impedance may be estimated based on a previous measurement of the loop impedance. For instance, the loop impedance may be measured in connection with installation of the field device.

Advantageously, however, the loop impedance may be estimated while the field device is in the alarm state. This may provide more reliable results, as variations over time of the loop impedance may occur. For instance, the loop impedance may increase over time due to corrosion or contamination.

According to embodiments, the controller may therefore be configured to: control the loop current circuitry to control the loop current to a first test current lower than the predefined alarm threshold current; acquire, from the voltage measurement circuitry a signal indicative of a first voltage received by the field device from the current loop when the loop current is controlled to the first test current; control the loop current circuitry to control the loop current to a second test current lower than the predefined alarm threshold current, different from the first test current; acquire, from the voltage measurement circuitry a signal indicative of a second voltage received by the field device from the current loop when the loop current is controlled to the second test current; and estimate the loop impedance based on the first test current, the second test current, the first voltage, and the second voltage.

According to a second aspect of the present invention, it is provided a method of operating a field device coupled to a two-wire current loop, the field device comprising measurement circuitry, loop current circuitry, voltage measurement circuitry, and a controller coupled to the measurement circuitry, the loop current circuitry, and the voltage measurement circuitry, the method comprising: acquiring a first value of a process variable from the measurement circuitry; determining if a voltage received by the field device from the current loop is sufficient to support a first loop current representing the first value of the process variable; controlling, when it is determined that the voltage received by the field device from the current loop is insufficient to support the first loop current, the loop current circuitry to control the loop current to an alarm current lower than a predefined alarm threshold current; acquiring a second value of the process variable from the measurement circuitry and a signal from the voltage measurement circuitry indicating a present voltage received by the field device from the current loop; determining a second loop current representing the second value of the process variable; determining, based on the signal indicating the present voltage received by the field device from the current loop and an estimation of a loop impedance of the current loop as seen by the field device, whether or not the present voltage received by the field device from the current loop is sufficient for supporting the second loop current; and controlling, when it is determined that the present voltage received by the field device from the current loop is sufficient for supporting the second loop current, the loop current circuitry to change the loop current from the alarm current to the second loop current.

In summary, the present invention thus relates to a field device comprising measurement circuitry; loop current circuitry; voltage measurement circuitry; and a controller configured to: acquire a first value of a process variable; determine if the voltage received by the field device is sufficient to support a first loop current; control, when the voltage is insufficient to support the first loop current, the loop current to an alarm current lower than a predefined alarm threshold current; acquire a second value of the process variable and a present voltage received by the field device; determine a second loop current; determine, based on the present voltage and an estimation of a loop impedance, whether or not the present voltage is sufficient for supporting the second loop current; and control, when it is determined that the present voltage received by the field device from the current loop is sufficient, the loop current from the alarm current to the second loop current.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

In the present detailed description, an exemplary embodiment of the field device according to the present invention is discussed with reference to a non-contact radar level gauge system. It should be noted that this by no means limits the scope of the present invention, which is equally applicable to other field devices, such as guided wave radar level gauge systems, temperature sensors, pressure sensors, etc. Moreover, the two-wire current loop may be configured to function according to various communication standards, such as 4-20 mA or HART.

Figure 1:
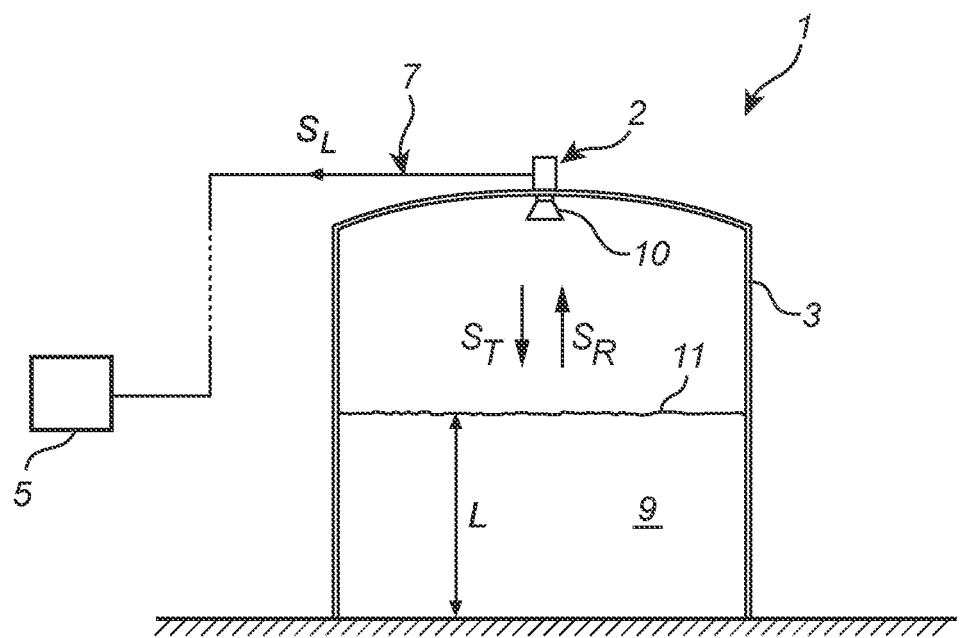
FIG. 1 schematically illustrates a measurement system including an exemplary field device, here in the form of a radar level gauge, installed at a tank.

FIG. 1 schematically illustrates a measurement system 1 including a field device in the form of a radar level gauge 2 installed at an exemplary tank 3. The radar level gauge 2 is connected to a remote host/master 5 via a two-wire current loop 7, which is also used to provide power to the radar level gauge 2. The tank 3 contains a product 9 and, when in operation, the radar level gauge 2 determines the filling level L of the product 9 in the tank 3 based on an electromagnetic transmit signal $S_T$ propagated towards the surface 11 of the product 9 by an antenna 10, and an electromagnetic reflection signal $S_R$ resulting from reflection of the transmit signal $S_T$ at the surface 11 and received by the antenna 10.

After having determined the filling level L, which is an example of a process variable, the radar level gauge 2 provides a measurement signal $S_L$ indicative of the filling level L to the remote host/master 5 via the two-wire current loop 7.

Figure 2:
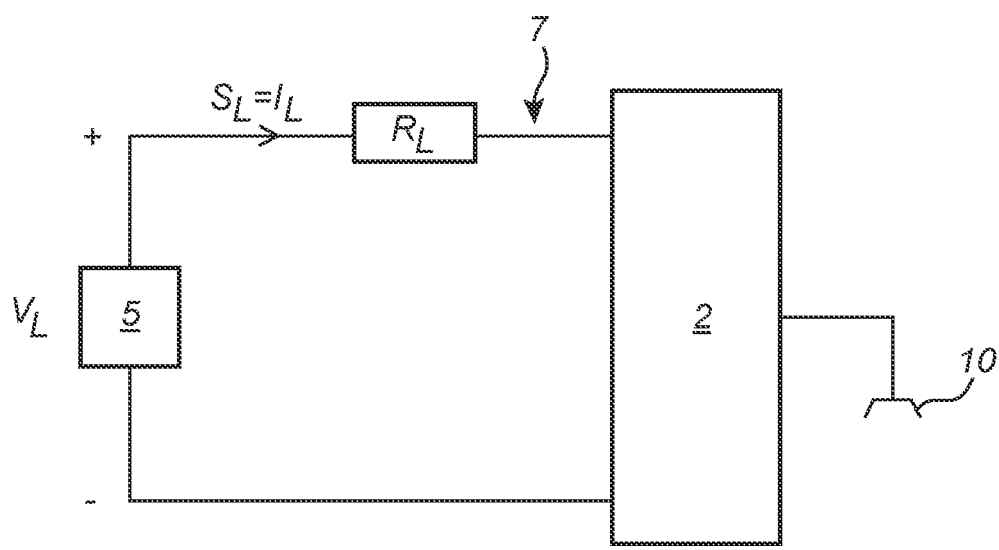
FIG. 2 is a block diagram of two-wire current loop and a loop powered field device connected to the current loop.

FIG. 2 is a block diagram of two-wire current loop 7 and the loop powered field device 2 connected to the current loop 7. As is schematically shown in FIG. 2, the above-mentioned measurement signal $S_L$ is here indicated as being provided in the form of a loop current $I_L$. Furthermore, the loop voltage $V_L$ provided by the remote host/master 5, and the loop impedance $R_L$ are indicated.

Figure 3:
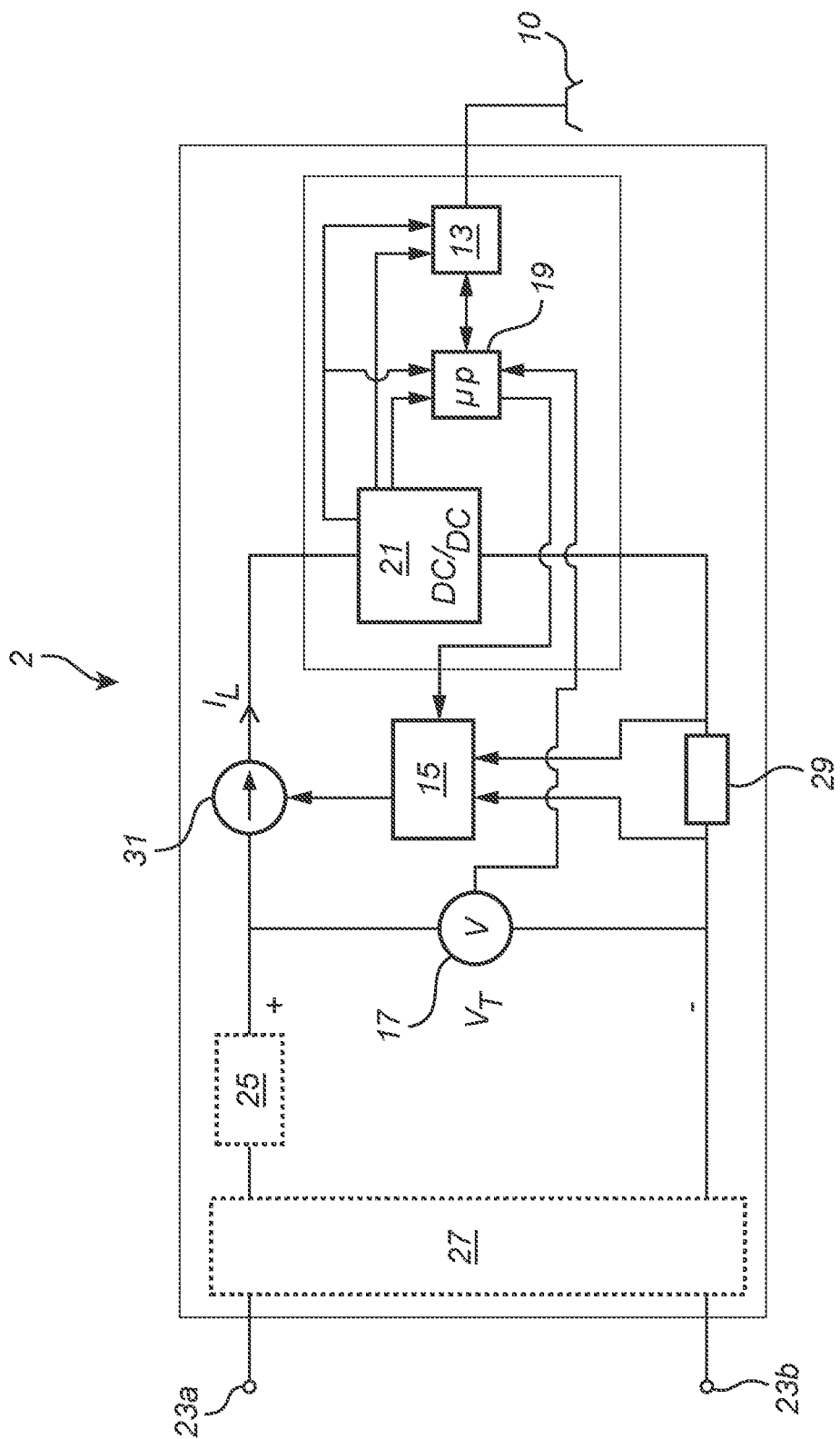
FIG. 3 is a more detailed block diagram of the field device in FIG. 2.

Referring to FIG. 3, which is a more detailed block diagram of the field device in FIG. 2, the field device 2 comprises measurement circuitry 13, loop current circuitry 15, voltage measurement circuitry 17, and a controller 19. As is schematically indicated in FIG. 3, the field device 2 may further comprise power converting circuitry, here indicated as a DC/DC converter 21, for providing power to the measurement circuitry 13 and the controller 19. The field device 2 further comprises terminals 23a-b for connection to the current loop 7, and may optionally include, per se known, circuitry for EMC-filtering and circuitry 27 for Ex-protection.

In per se known ways, the measurement circuitry 13 is configured to determine a value of a process variable using energy received via the two-wire current loop 7, by way of the power converting circuitry 21. The loop current circuitry is arranged to measure the loop current $I_L$, for example by measuring the voltage drop across a known resistor 29, and to control the loop current $I_L$, for example by means of current regulator 31. The voltage measurement circuitry 17 is configured to provide a signal indicative of the voltage received by the field device 2. In the example configuration in FIG. 3, the voltage measurement circuitry 17 is arranged to measure the voltage $V_T$ received by the power converting circuitry 21, which may be lower than the voltage across the terminals 23a-b due to voltage drops over the circuitry 25 for EMC-filtering and the circuitry 27 for Ex-protection.

As is schematically indicated in FIG. 3, the controller 19 is coupled to the measurement circuitry 13, the loop current circuitry 15, and the voltage measurement circuitry 17, for controlling operation of the field device 2.

Figure 4:
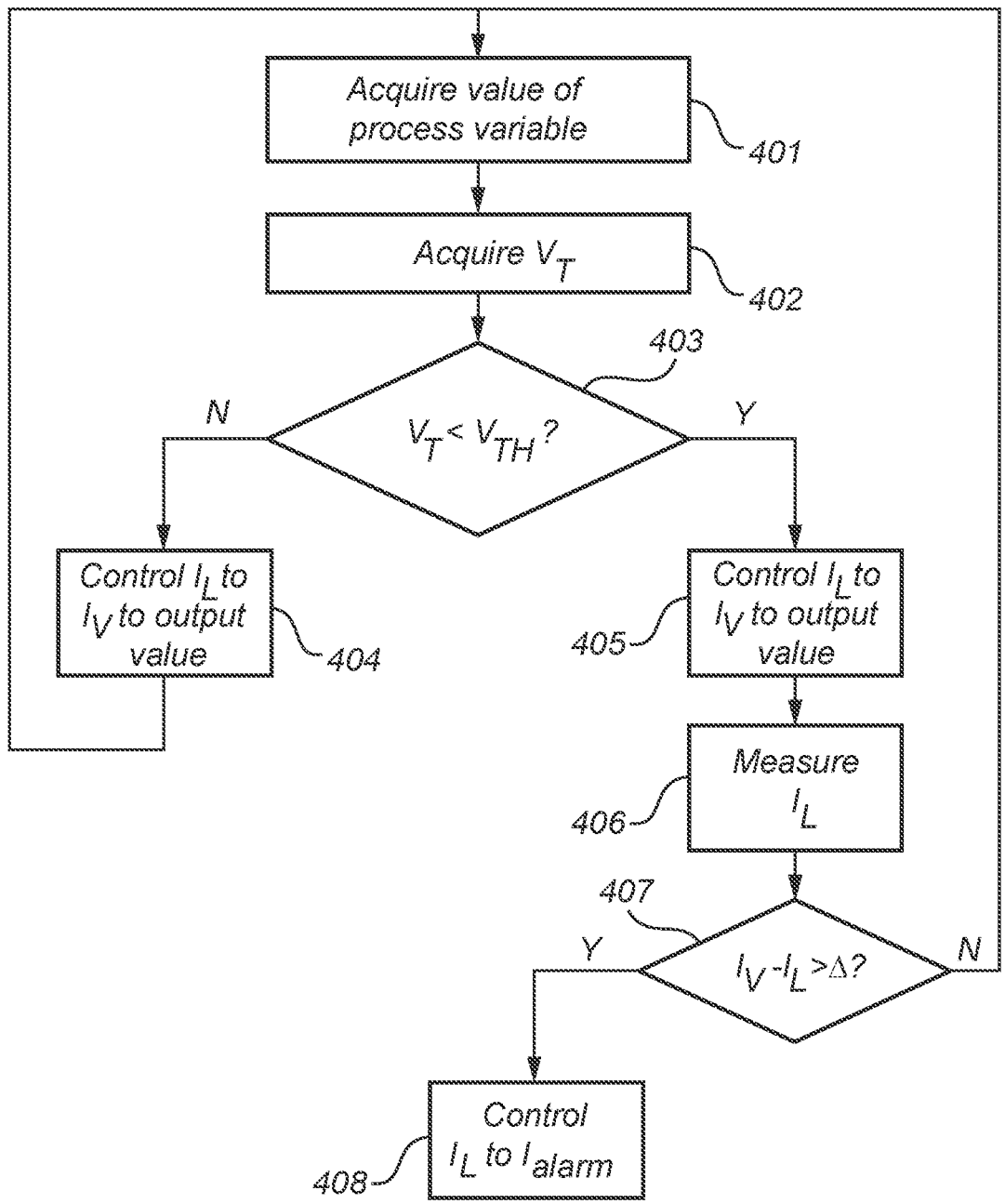
FIG. 4 is a flow-chart illustrating an exemplary method of operating a field device, including steps for determining whether or not to enter a low voltage alarm state.

FIG. 4 is a flow-chart illustrating an exemplary method of operating a field device, including steps for determining whether or not to enter a low voltage alarm state.

In a first step 401, a value of a process variable is acquired from the measurement circuitry 13, by the controller 19.

According to an aspect of the present invention, the following steps may advantageously be performed to determine if the voltage received by the field device 2 is sufficient to support a loop current representing the acquired value.

In step 402, a signal indicative of the voltage $V_T$ received by the field device 2 is acquired from the voltage measurement circuitry 17, by the controller 19.

If it is determined in step 403 that the voltage $V_T$ received by the field device 2 is higher than a predefined voltage $V_{TH}$, the loop current circuitry 15 is controlled, in step 404, by the controller 19, to control the loop current $I_L$ to a current $I_V$ corresponding to the value acquired in step 401. Thereafter, the method continues normal operation by returning to step 401.

If it is instead determined in step 403 that the voltage $V_T$ received by the field device 2 is lower than the predefined voltage $V_{TH}$ (or lower than another predefined voltage lower than $V_{TH}$), the method proceeds to step 405, where the loop current circuitry 15 is controlled, by the controller 19, to control the loop current $I_L$ to the current $I_V$ corresponding to the value acquired in step 401.

In the subsequent step 406, the resulting loop current $I_L$ is measured, and compared with the desired loop current $I_V$. If it is determined in step 407 that the difference between the desired loop current $I_V$ and the actual loop current $I_L$ is less than a predefined difference $\Delta$, the method continues normal operation by returning to step 401.

If it is instead determined in step 407 that the difference between the desired loop current $I_V$ and the actual loop current $I_L$ is greater than the predefined difference $\Delta$, it is concluded that the voltage received by the field device 2 from the current loop 7 is insufficient to support the desired loop current $I_V$ and the method proceeds to step 408, where the loop current circuitry 15 is controlled, by the controller 19, to control the loop current $I_L$ to an alarm current $I_{alarm}$ that is lower than a predefined alarm threshold current. For a 4-20 mA current loop, the predefined alarm threshold current may, for example, be around 3.6 mA.

Figure 5:
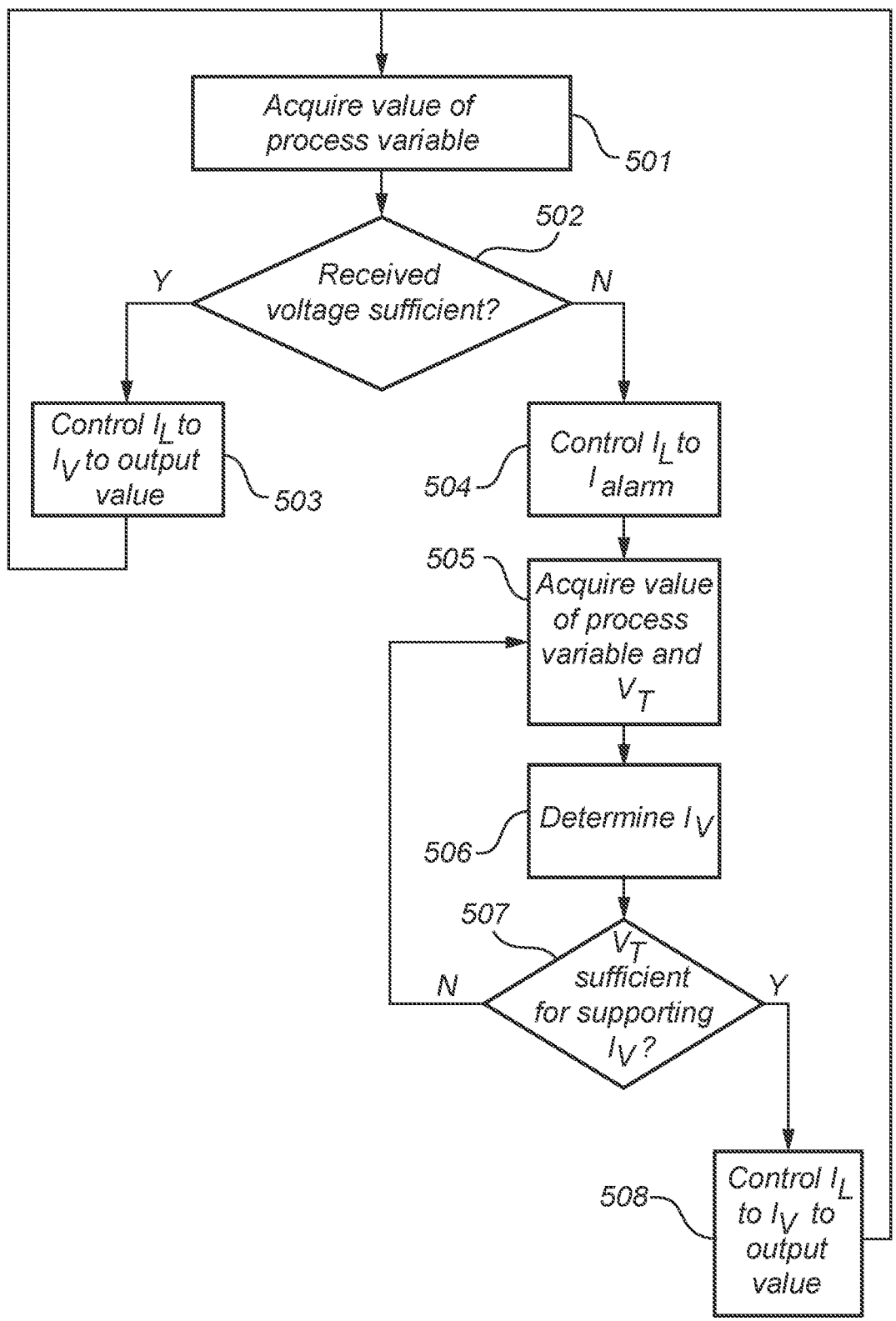
FIG. 5 is a flow-chart illustrating an exemplary method of operating a field device, including steps for determining whether or not to leave a low voltage alarm state.

FIG. 5 is a flow-chart illustrating an exemplary method of operating a field device, including steps for determining whether or not to leave a low voltage alarm state.

In a first step 501, a value of a process variable is acquired from the measurement circuitry 13, by the controller 19.

In the subsequent step 502, it is determined if a voltage received by the field device 2 from the current loop 7 is sufficient to support a loop current representing the acquired value.

If it is determined in step 502 that the voltage received by the field device 2 from the current loop 7 is sufficient, the loop current circuitry 15 is controlled, in step 503, by the controller 19, to control the loop current $I_L$ to a current $I_V$ corresponding to the value acquired in step 501. Thereafter, the method continues normal operation by returning to step 501.

If it is instead determined in step 502 that the voltage received by the field device 2 from the current loop 7 is insufficient to control the loop current $I_L$ to the current $I_V$ corresponding to the process value acquired in step 501, the loop current circuitry 15 is controlled, in step 504, by the controller 19, to control the loop current $I_L$ to an alarm current $I_{alarm}$ that is lower than a predefined alarm threshold current.

The determination of whether or not the voltage received by the field device 2 is sufficient to support a loop current representing the acquired value may advantageously be performed as described above with reference to FIG. 4. It should, however, be noted that this determination may be carried out differently, and that the method described with reference to FIG. 5 is not limited to any particular method of determining whether or not the voltage received by the field device 2 is sufficient to support a loop current representing the acquired value.

In step 505, while the loop current circuitry 15 is controlled by the controller 19 to control the loop current to the alarm current $I_{alarm}$, the controller 19 acquires a new value of the process variable from the measurement circuitry 13. In this step, a signal from the voltage measurement circuitry 17 indicating a present voltage $V_T$ received by the field device 2 from the current loop 7 is also received by the controller 19.

A new current $I_V$ representing the new value of the process variable is determined in step 506.

Thereafter, in step 507, it is determined by the controller 19, based on the signal indicating the present voltage $V_T$ received by the field device 2 from the current loop 7 and an estimation of the loop impedance $R_L$ of the current loop 7 as seen by the field device 2, whether or not the present voltage $V_T$ received by the field device 2 from the current loop 7 is sufficient for supporting the loop current $I_V$ determined in step 506.

The loop impedance $R_L$ may be estimated based previous measurements. Advantageously, however, a fresh estimation of the loop impedance $R_L$ may be carried out by controlling the loop current circuitry to control the loop current to a first current lower than the predefined alarm threshold current; acquiring, from the voltage measurement circuitry a signal indicative of a first voltage received by the field device from the current loop when the loop current is controlled to the first current; controlling the loop current circuitry to control the loop current to a second current lower than the predefined alarm threshold current, different from the first current; acquiring, from the voltage measurement circuitry a signal indicative of a second voltage received by the field device from the current loop when the loop current is controlled to the second current; and estimating the loop impedance based on the first test current, the second test current, the first voltage, and the second voltage.

It should be noted that, in the example configuration of the field device 2 shown in FIG. 3, the impedances of the circuitry 25 for EMC-filtering and the circuitry 27 for Ex-protection are included in the estimation of the loop impedance $R_L$.

According to a specific, non-limiting, example, the voltage $V_T$ measured by the voltage measurement circuitry is estimated to related to the loop voltage $V_L$, the loop current $I_L$, and the loop impedance $R_L$ as follows:

$$V_T = I_L R_L \quad (1)$$

According to this example, first and second test currents may be selected as follows:

$$I_{TEST1} = 3.6 \text{ mA}$$

$$I_{TEST2} = 3.6 \text{ mA} - \Delta$$

These test currents are correlated to the corresponding measured voltages as follows:

$$V_{T1} = V_L - I_{TEST1} R_L \quad (2)$$

$$V_{T2} = V_L - I_{TEST2} R_L \quad (3)$$

Based on (2) and (3), the loop impedance $R_L$ and the loop voltage $V_L$ can be estimated as follows:

$$R_L = \frac{(V_{T1} - V_{T2})}{\Delta} \quad (4)$$

$$V_L = \frac{(V_{T1} + V_{T2} + \Delta R_L)}{2} \quad (5)$$

The minimum voltage $V_{Tmin}$ that is sufficient for supporting the loop current $I_V$ corresponding to the present process value can then be estimated as follows:

$$V_{Tmin} = V_L - I_V R_L \quad (6)$$

If it is determined by the controller 19, in step 507, that the present voltage $V_T$ received by the field device 2 is sufficient for supporting the loop current $I_V$ determined in step 506, the loop current circuitry 15 is controlled, in step 508, by the controller 19, to control the loop current $I_L$ to the current $I_V$ corresponding to the value acquired in step 505. Thereafter, the method continues normal operation by returning to step 501.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. A field device comprising:
   measurement circuitry for determining a value of a process variable using energy received via a two-wire current loop;
   loop current circuitry for controlling a loop current flowing through the current loop;
   voltage measurement circuitry for providing a signal indicative of a voltage received by the field device from the current loop; and
   a controller coupled to the measurement circuitry, the loop current circuitry, and the voltage measurement circuitry, the controller being configured to:
   acquire a first value of the process variable from the measurement circuitry;
   determine if the voltage received by the field device from the current loop is sufficient to support a first loop current representing the first value of the process variable;
   control, when it is determined that the voltage received by the field device from the current loop is insufficient to support the first loop current, the loop current circuitry to control the loop current to an alarm current lower than a predefined alarm threshold current;
   acquire a second value of the process variable from the measurement circuitry and a signal from the voltage measurement circuitry indicating a present voltage received by the field device from the current loop;
   determine a second loop current representing the second value of the process variable;
   determine, based on the signal indicating the present voltage received by the field device from the current loop and an estimation of a loop impedance of the current loop as seen by the field device, whether or not the present voltage received by the field device from the current loop is sufficient for supporting the second loop current; and
   control, when it is determined that the present voltage received by the field device from the current loop is sufficient for supporting the second loop current, the loop current circuitry to change the loop current from the alarm current to the second loop current.

2. The field device according to claim 1, wherein the controller is configured to:
   control the loop current circuitry to control the loop current to a first test current lower than the predefined alarm threshold current;
   acquire, from the voltage measurement circuitry a signal indicative of a first voltage received by the field device from the current loop when the loop current is controlled to the first test current;
   control the loop current circuitry to control the loop current to a second test current lower than the predefined alarm threshold current, different from the first test current;
   acquire, from the voltage measurement circuitry a signal indicative of a second voltage received by the field device from the current loop when the loop current is controlled to the second test current; and
   estimate the loop impedance based on the first test current, the second test current, the first voltage, and the second voltage.

3. The field device according to claim 2, wherein the controller is configured to estimate the loop impedance based on a relation between a difference between the first voltage and the second voltage, and a difference between the first test current and the second test current.

4. The field device according to claim 1, wherein the controller is configured to determine if the voltage received by the field device from the current loop is sufficient to support the first loop current by:
  controlling the loop current circuitry to control the loop current to the first current;
  acquiring a value indicative of an actual loop current; and
  determining, when a difference between the first current and the actual loop current is greater than a predefined difference, that the voltage received by the field device from the current loop is insufficient to support the first loop current.

5. The field device according to claim 4, wherein the controller is configured to:
  acquire, from the voltage measurement circuitry, a time series of voltages received by the field device from the current loop; and
  only carry out the actions according to claim 4 when the voltage received by the field device from the current loop is lower than a predefined voltage.

6. The field device according to claim 1, wherein the field device is a radar level gauge, comprising a signal propagating device, for determining a filling level of a product in a tank, wherein the measurement circuitry comprised in the radar level gauge includes:
  a transceiver for generating electromagnetic signals, providing an electromagnetic transmit signal to the signal propagating device, and receiving from the signal propagating device an electromagnetic reflection signal resulting from reflection of the transmit signal at a surface of the product; and
  processing circuitry for determining the filling level based on the transmit signal and the reflection signal.

7. A method of operating a field device coupled to a two-wire current loop, the field device comprising measurement circuitry, loop current circuitry, voltage measurement circuitry, and a controller coupled to the measurement circuitry, the loop current circuitry, and the voltage measurement circuitry, the method comprising:
  acquiring a first value of a process variable from the measurement circuitry;
  determining if a voltage received by the field device from the current loop is sufficient to support a first loop current representing the first value of the process variable;
  controlling, when it is determined that the voltage received by the field device from the current loop is insufficient to support the first loop current, the loop current circuitry to control the loop current to an alarm current lower than a predefined alarm threshold current;
  acquiring a second value of the process variable from the measurement circuitry and a signal from the voltage measurement circuitry indicating a present voltage received by the field device from the current loop;
  determining a second loop current representing the second value of the process variable;
  determining, based on the signal indicating the present voltage received by the field device from the current loop and an estimation of a loop impedance of the current loop as seen by the field device, whether or not the present voltage received by the field device from the current loop is sufficient for supporting the second loop current; and
  controlling, when it is determined that the present voltage received by the field device from the current loop is sufficient for supporting the second loop current, the loop current circuitry to change the loop current from the alarm current to the second loop current.

8. The method according to claim 7, further comprising:
  controlling the loop current circuitry to control the loop current to a first current lower than the predefined alarm threshold current;
  acquiring, from the voltage measurement circuitry a signal indicative of a first voltage received by the field device from the current loop when the loop current is controlled to the first current;
  controlling the loop current circuitry to control the loop current to a second current lower than the predefined alarm threshold current, different from the first current;
  acquiring, from the voltage measurement circuitry a signal indicative of a second voltage received by the field device from the current loop when the loop current is controlled to the second current; and
  estimating the loop impedance based on the first test current, the second test current, the first voltage, and the second voltage.

9. The method according to claim 8, wherein the loop impedance is estimated based on a relation between a difference between the first voltage and the second voltage, and a difference between the first test current and the second test current.

10. The method according to claim 7, wherein determining if the voltage received by the field device from the current loop is sufficient to support the first loop current comprises:
  controlling the loop current circuitry to control the loop current to the first current;
  acquiring a value indicative of an actual loop current; and
  determining, when a difference between the first current and the actual loop current is greater than a predefined difference, that the voltage received by the field device from the current loop is insufficient to support the first loop current.

11. The method according to claim 10, comprising:
  acquiring, from the voltage measurement circuitry, a time series of voltages received by the field device from the current loop; and
  only carry out the steps according to claim 10 when the voltage received by the field device from the current loop is lower than a predefined voltage.

12. The method according to claim 7, wherein the field device is a radar level gauge, comprising a signal propagating device, for determining a filling level of a product in a tank, wherein determining the filling level includes:
  generating electromagnetic signals;
  providing an electromagnetic transmit signal to the signal propagating device;
  receiving from the signal propagating device an electromagnetic reflection signal resulting from reflection of the transmit signal at a surface of the product; and
  determining the filling level based on a timing relation between the transmit signal and the reflection signal.

* * * * *